(No Model.)

3 Sheets—Sheet 1.

W. H. LENHART.
LATHE FOR TURNING ECCENTRIC OR POLYGONAL FORMS.

No. 252,481. Patented Jan. 17, 1882.

Attest:
A. Barthel
E. Scully

Inventor:
William H. Lenhart
by Thos. S. Sprague
Att'y (No Model.)  3 Sheets—Sheet 2.

W. H. LENHART.
LATHE FOR TURNING ECCENTRIC OR POLYGONAL FORMS.

No. 252,481. Patented Jan. 17, 1882.

Attest:
A. Barthel
E. Scully

Inventor:
William H. Lenhart
by Thos. S. Sprague
Att'y (No Model.) 3 Sheets—Sheet 3.
W. H. LENHART.
LATHE FOR TURNING ECCENTRIC OR POLYGONAL FORMS.
No. 252,481. Patented Jan. 17, 1882.
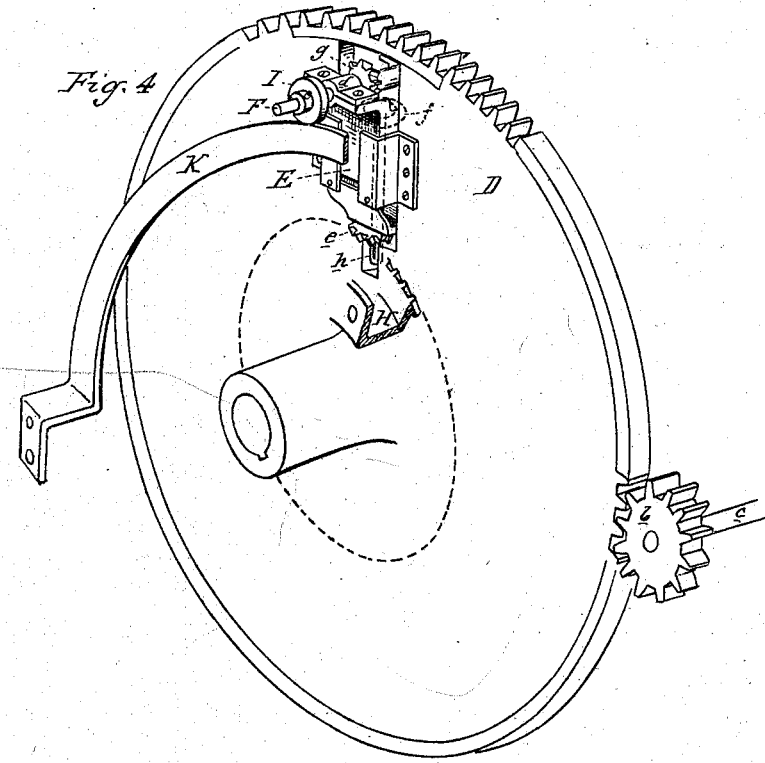
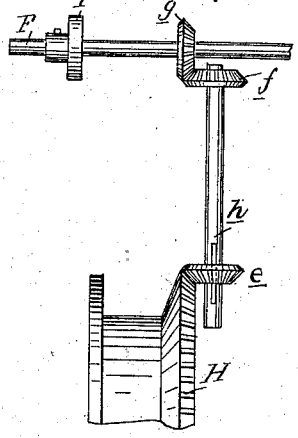
Attest:
A. Barthel
Chas. J. Hunt
Inventor:
William H. Lenhart
by Thos. S. Sprague
Att'y

UNITED STATES PATENT OFFICE.

WILLIAM H. LENHART, OF DEFIANCE, OHIO.

LATHE FOR TURNING ECCENTRIC OR POLYGONAL FORMS.

SPECIFICATION forming part of Letters Patent No. 252,481, dated January 17, 1882.

Application filed July 27, 1881. (No model.)

*To all whom it may concern:*

Be it known that I, WILLIAM H. LENHART, of Defiance, in the county of Defiance and State of Ohio, have invented an Improvement in Lathes for Turning Irregular and Concentric Forms, of which the following is a specification.

The object of my invention is to so construct a lathe as to adapt it to turn different articles of manufacture, such as spokes, whiffletrees, neck-yokes, plow-rounds, &c.—forms which are either irregular or wholly or partly concentric; and my invention consists, first, in the novel application of mechanical devices for producing a planetary movement of the work when the lathe is intended to turn oval forms; second, in the construction and arrangement of devices for adapting the lathe to turn concentric forms; third, in the arrangement of devices for turning polygonal forms; fourth, in adapting my lathe to combine the various forms so as to produce composite forms; fifth, in the peculiar construction of a cutter-head with expansible knife-stocks; sixth, in general features of construction, whereby the capacity of my machine for doing work is greatly increased, its operating parts simplified, and great ease of adjustment for different work obtained.

Figure 1:
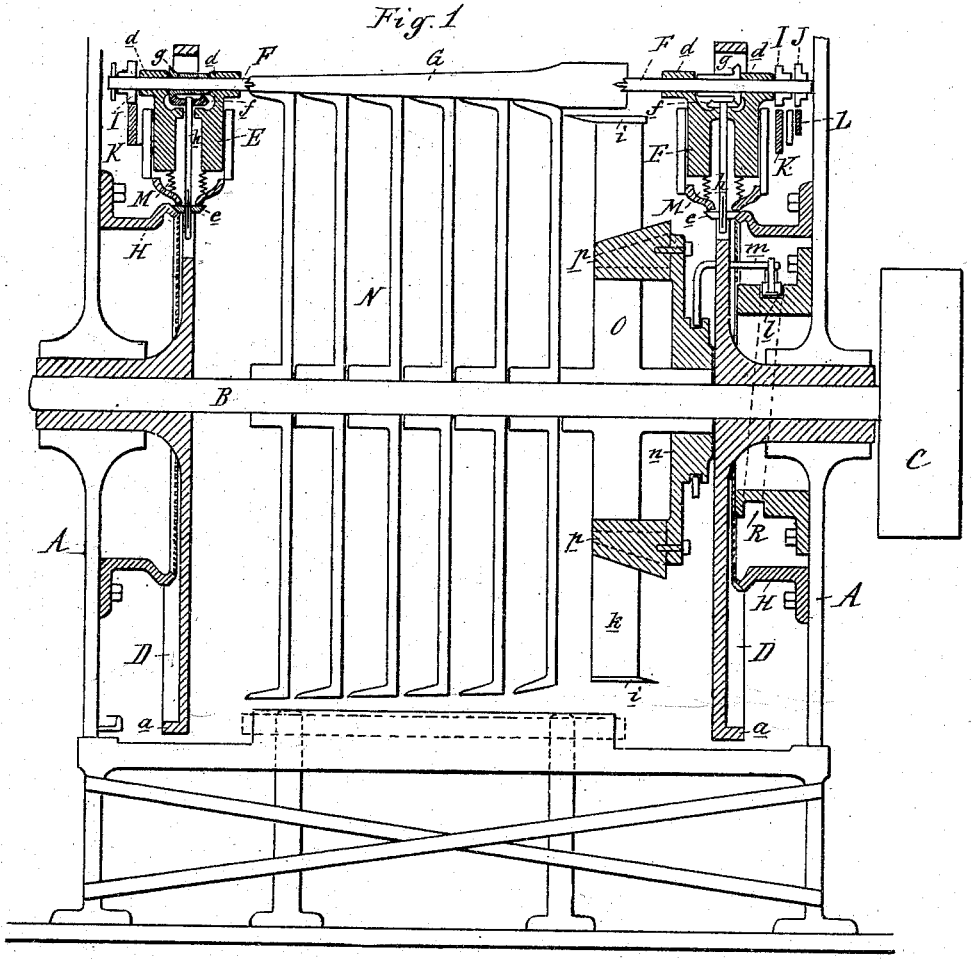
Figure 2:
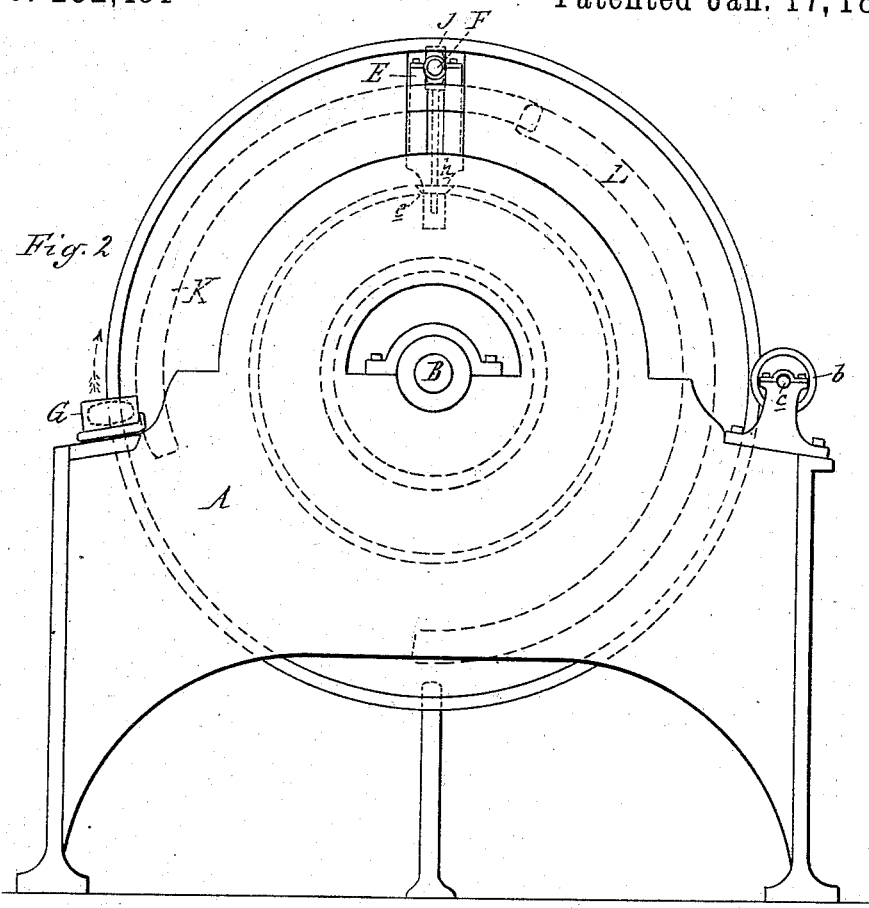
Figure 3:
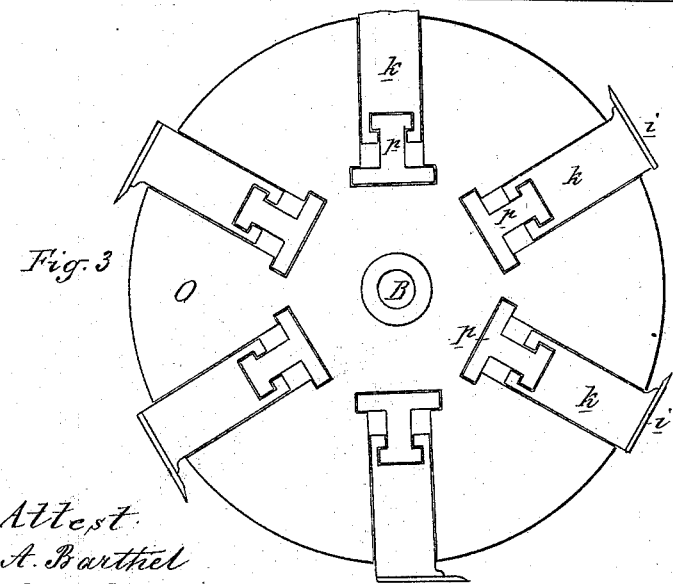

In the drawings which form a part of this specification my machine is shown as arranged for cutting spokes, and Figure 1 is a vertical axial section of the same. Fig. 2 is an end view. Fig. 3 is a detached view of the cutter-head with expansible knife-stocks. Fig. 4 is a detached perspective view, showing the gears for operating the lathe-spindle, the manner of securing said spindle, and the cam and guide for radially operating the spindle; Fig. 5, a detail view, showing more clearly the gears for operating the lathe-spindles.

A A are the two end sections of the frame, which support my machine, and in which the main shaft B is supported. Sleeved upon the shaft B and journaled in the ends A A of the frame are the two like disks D D. These disks are provided with the spur-gears $a$ $a$, which mesh with pinions $b$ $b$ on the shaft $c$, journaled on one side of the frame, and by which a rotary motion may be given to the disks independent of the motion of the shaft B.

E E are two blocks, one of which is recessed into each disk and secured therein in such manner as to be held therein firmly against any displacement except in one direction, and which is radially to the disks, and is brought about and controlled in the manner and by the means hereinafter described.

F F are the two spindles of the lathe, between which the stick G (which in the drawings is shown as a spoke-blank) is dogged. They revolve in bearings $d$ $d$, which form part of the sliding blocks E E. Fastened to the inner side of each of the end frames, A A, is a circular bevel-gear, H, which, when the disks D D are rotating, communicates motion to each spindle F F through the intermediate miter-pinions, $e$, $f$, and $g$. The miter-pinion $f$ is rigidly secured to the shaft $h$, which latter is feathered on its inner end to allow it to slide through the miter-pinion $e$, which is confined in its relative position upon the disk, as shown in Fig. 1.

Secured to the free end of one or both spindles F F are the cams I and J, traveling respectively upon the guideways K and L, bolted to the inner sides of the frames A A.

The guideway K and the oval cam I, as used at one end of the machine, are clearly shown in Fig. 4.

In the drawings, I is an oval cam; J, an oblong cam. The guideway K is involute, the guideway L a segment of a circle.

M are springs so arranged as to exert their tension to draw the blocks E into their recesses and keep the cams I and J' upon the guideways. A series of like cutter-heads, N, are secured to the shaft B in such position and number as to exert their cutting action the whole length of the stick to be operated upon. In their construction they are like the cutter-head O, (shown in Fig. 3;) but their knives are secured to their faces in a stationary manner.

O is another cutter-head, secured to the shaft B, and is provided upon its face with a series of knives, $i$, secured to knife-stocks $k$, which latter are recessed into the cutter-head O in such manner as to adapt them to be radially projected or retracted upon the cutter-head O. This projecting and retracting of the stocks is brought about by the action of the wedges $p$, which traverse the inner ends of the knives' stocks, and are urged on by the grooved cam R, which advances and retracts the knives through the media of roller *l*, arm *m*, and grooved disk *n*, to which latter the wedges are secured, all as clearly shown in the drawings.

I now proceed to describe the operation of the machine, illustrated in the drawings as set for turning spokes.

In Fig. 2 the stick is shown in the position in which it is delivered to the machine, and automatically dogged by the spindles F F, which are actuated thereto by any of the well-known devices. The machine being in motion, the stick is carried in the direction of the arrow, (the disks D D revolving at the rate of about fifteen turns per minute,) submitting it to the action of the cutter-heads N, which revolve in a direction opposite to the disks at a speed of about six hundred turns per minute. The position of the stick in relation to the cutter-heads N is now entirely governed by the cams I, traveling upon the guideways K, which are involute, so as to reduce the stick gradually to the desired size; and if the cam I upon the spindle *b*, which holds the felly end of the spoke, is oval, the latter will also be oval, passing into a more elongated oval toward the throat of the spoke, which will be in form similar to the oval cam I upon the spindle *b*, holding the hub end. When the disks D D have made about one-fourth revolution the body of the spoke will be finished, and the spindle upon the hub of the spoke is now governed by the squaring-cam J, which has commenced its travel upon the guideway L, and when the cutter-heads N have finished acting upon the stick the cutter-head O is made to act, the cam R being so adjusted as to urge the knife-stocks *h* sufficiently out of their recesses to make the knives *i* begin to cut the foot of the spoke into a form similar to the shape of the cam J, and one or more of the knives *i* can be so adjusted as to square also the throat of the spoke. As soon as the knife-stocks *p* are projected out as far as the cam R will urge them the squaring of the foot of the spoke is finished, as this will be done before the disks D D have finished three-fourths of a revolution. The spoke can be tripped out automatically at or near the bottom of my machine, thus having the spindles *b b* ready to seize another stick at the former point.

It will be seen that all parts of my machine can be kept in continual motion—that is, no stoppage is required for the insertion or liberation of the objects to be turned—owing to the use of a rotating bed whereon the object is finished before one revolution of the bed is completed.

In furnishing such machines as herein described to the trade the particular use to which the machine is put will of course govern the shape and number of knives, the number, position, and shape of the cams I and J and guideways K and L, and these parts are therefore detachably secured. For making oval work, for example, no squaring-cams are needed, but oval cams for both spindles. For concentric work the oval cam is replaced by a circular cam. In constructing my machine for doing principally round turning two or three pairs of spindles can be used, whereby the capacity of the machine for work is greatly increased.

As any skilled workman can easily adjust my machine to any of the various uses to which it is adapted, I refrain from further description.

What I claim as my invention is—

1. In a lathe for turning irregular forms, the rotating disks D and spindles *b b*, revolving in bearings movable radially in said disks, in combination with stationary guideways secured to the lathe-frame and cams secured on the spindles and traveling upon said stationary guideways, substantially as and for the purpose specified.

2. The revolving disks D, provided with radial recesses, and the blocks E E, reciprocating in said recesses and carrying the revolving spindles F, in combination with cams secured on said spindles and guideways rigidly secured to the stationary lathe-frame, whereby the cams moving on the guideways will govern the radial movement of the spindles, substantially as and for the purpose specified.

3. The combination of spindle F, squaring-cam J, guideway L, and cutter-head O, containing expanding and contracting knife-stocks K, and mechanism, substantially as described, for operating said knife-stocks, as and for the purposes described.

4. In combination with a series of revolving cutter-heads, rotary disks carrying independent radially-movable spindles around said cutter-heads, stationary guideways upon the main frame, and cams secured to the spindles traveling on the stationary guideways, whereby the spindles can be moved radially to or from the cutter-heads to govern the shape of the object being turned, substantially as described.

5. The cutter-head O, provided with radial recesses, the knife-stocks *k*, sliding in said recesses and carrying knives at their outer ends, in combination with the disk *n* and the wedges *p*, said wedges being constructed to slide one in the rear of each knife-stock, and each having tongues to slide in undercut recesses in its knife-stock, whereby they will advance or retract the knife-stocks with a positive movement, substantially as described.

6. As a means for giving motion to the adjustable spindles F, the combination of spur-gear H, rotary disk D, feathered shaft *h*, miter-pinions *e f g*, and radially-adjustable blocks E, when arranged and operating as described.

7. In a lathe for turning irregular forms, the combination of a series of cutter-heads which simultaneously work upon the stick in combination with two revolving spindles, stationary guideways secured to the lathe-frame, and exchangeable cams secured upon the spindles, whereby the movement of said cams upon the guideways will automatically and independently adjust the spindles, substantially as and for the purpose specified.

8. In a lathe for cutting spokes, the combination of a series of revolving cutter-heads, N and O, the radially self-adjusting spindles F F, the oval and squaring cams I and J, and involute guideways K, and circular guideway L, when operating and combined substantially as described.

9. The cutter-head O, knife-stocks k, wedges p, and the grooved disk n, carrying said wedges, in combination with the stationary grooved cam R, the roller l, and the arm m, substantially as and for the purpose specified.

WILLIAM H. LENHART.

Witnesses:
CHARLES SEYMOUR,
P. KETTENSING.